United States Patent [19]
Ast

[11] Patent Number: 4,763,574
[45] Date of Patent: Aug. 16, 1988

[54] RECOMPRESSED HAY BALE SHEAR

[76] Inventor: Gene Ast, 231 Midway, San Jacinto, Calif. 92383

[21] Appl. No.: 98,938

[22] Filed: Sep. 21, 1987

[51] Int. Cl.$^4$ .................. B65B 13/20; B30B 15/08
[52] U.S. Cl. ..................... 100/98 R; 100/188 R; 100/7; 83/856
[58] Field of Search ........... 83/856; 100/98 R, 188 R, 100/7

[56] References Cited

U.S. PATENT DOCUMENTS

| | | | |
|---|---|---|---|
| 1,259,477 | 3/1918 | Beard | 83/856 X |
| 3,099,203 | 7/1963 | Klemm et al. | 100/98 R |
| 3,509,926 | 5/1970 | Morris | 83/856 X |
| 4,676,153 | 6/1987 | Ast | 100/7 |

Primary Examiner—Andrew M. Falik
Attorney, Agent, or Firm—Frank J. Dykas

[57] ABSTRACT

A stationary knife blade for shearing bales of recompressed hay disposed across the discharge end of a decompression chamber of a recompression apparatus designed to recompress and retie bales of fibrous material.

1 Claim, 7 Drawing Sheets

RECOMPRESSED HAY BALE SHEAR

BACKGROUND OF THE INVENTION

1. Field of the Invention.

This invention relates to hay baling and means therefor and more particularly to means for shearing recompressed hay bales to facilitate handling thereof.

2. Description of Prior Art.

The art of hay baling is well known. A more recent development is the introduction of means for further recompressing conventional bales to reduce the volume thereof to facilitate shipment. This art is exemplified by my apparatus and method for recompressing bales of fibrous material, U.S. Pat. No. 4,676,153. The reduced unit shipping cost achieved by use of this method of recompression makes it economically feasible to ship hay grown in the United States to islands, island nations and other countries overseas where agricultural land is at a premium.

The present invention is a refinement of the art of hay bale recompression. It is in response to end user demands caused by the fact that a recompressed bale is approximately sixteen inches square and oftentimes weighs over one hundred and twenty pounds. The end users find it difficult to manually handle bales weighing that much, and find it very desirable to cut the bale in half to reduce the weight to no more than eighty pounds per unit. It should be recognized that the inventive concept embodied herein is equally adaptable to use with all manners of bales of fibrous material, including straw, cotton and the like.

A recompressed bale of alfalfa, hay, or other similar fibrous material is very dense and difficult to cut. The present technology utilizes a rotary buzz saw similar to the type used in lumber mills for rough sawing dimensional lumber. Some of the problems associated with using a rotary buzz saw for cutting recompressed bales of fibrous material include a substantial amount of extra labor and the cost involved therewith, and the wear and tear on equipment. It is not unusual to have to sharpen the blade of a rotary buzz saw, which is being used for cutting recompressed bales of hay, every few hours.

Means for shearing recompressed bales are not found in the prior art. One of the primary reasons is that it is very difficult to hold a highly compacted bale of fibrous material in position long enough to shear it in half without breaking the bale twine or wires which are under considerable tensile stress and are holding the recompressed bale together. What happens when one attempts to shear a recompressed bale is that the forces imparted to the recompressed bale necessary to shear it are more than sufficient to break the bale twine or wires apart.

However, the conventional art of hay baling discloses means for cutting conventional hay bales in two. Typical of this art is KLEMM, ET AL., U.S. Pat. No. 3,099,203, which discloses means integral with a conventional baler for cutting the hay bale in two. The means therein comprises a stationary blade and a reciprocating blade which coact to shear the bale as it is formed in the baling chamber of a conventional baling machine. The reciprocating blade is carried on the bale plunger which compresses the hay into the baling chamber.

GROENEVELD, ET. AL. U.S. Pat. No. 4,549,481, disclosed means for slicing a large round bale into two parts prior to discharge from the baler. The cutting means comprises a knife blade which may be inserted into the baling chamber to the center thereof and which cuts the bale as it is rotated within the chamber.

MASON, U.S. Pat. No. 2,731,782, discloses a continuous flow baler with a guillotine like knife operating perpendicular the line of extrusion to cut the compressed material into descrete bales.

Conventional hay baling machines generally incorporate some means for shearing the feed material as it enters the baling chamber. Examples of this art include PARADISE, U.S. Pat. Nos. 2,688,284; WEBSTER, ET AL., 3,782,275; ROBINSON, JR., ET AL., 3,906,852; and MORRISON, 2,687,690. The purpose of such shearing action is to facilitate loading of the feed material into the baling or compression chamber.

BRADY, U.S. Pat. No. 3,006,272, discloses a hay conditioning device which produce a hay briquette when the material is compressed and fed through a cutter. The cutters are arranged to coact with a plunger to cut the material into roughly cube shapes.

None of the above cited references will work for cutting recompressed bales of fibrous material.

Accordingly, it is an object of this invention to provide a means for shearing a recompressed bale. It is another object of the invention to provide a means of containing a recompressed bale during the shearing operation so as to prevent it from breaking apart. Another object of this invention is to provide a means whereby the bale is automatically sheared at the conclusion of the recompression process. A final object of this invention is to provide a means for shearing a bale into two separate halves without any additional labor and machinery cost being incurred by the operator.

SUMMARY OF THE INVENTION

These objects are accomplished by use of an elongated chamber having an inlet and an outlet, and adapted in size and shape to receive a recompressed bale and hold the same under compression. A stationary knife blade, detachably mounted across the cross section of the chamber is provided, with a sharp edge for impinging against an advancing recompressed bale. Means are provided for advancing the recompressed bale through the chamber and against the knife blade and ultimately out, in two pieces, through the outlet of the chamber. In the preferred embodiment, means for advancing is the ejection ramp which is used to eject the recompressed bale from a recompression chamber of a hay bale recompressing apparatus.

DETAILED DESCRIPTION OF THE PREFERRED EMBODIMENT

Figure 5:
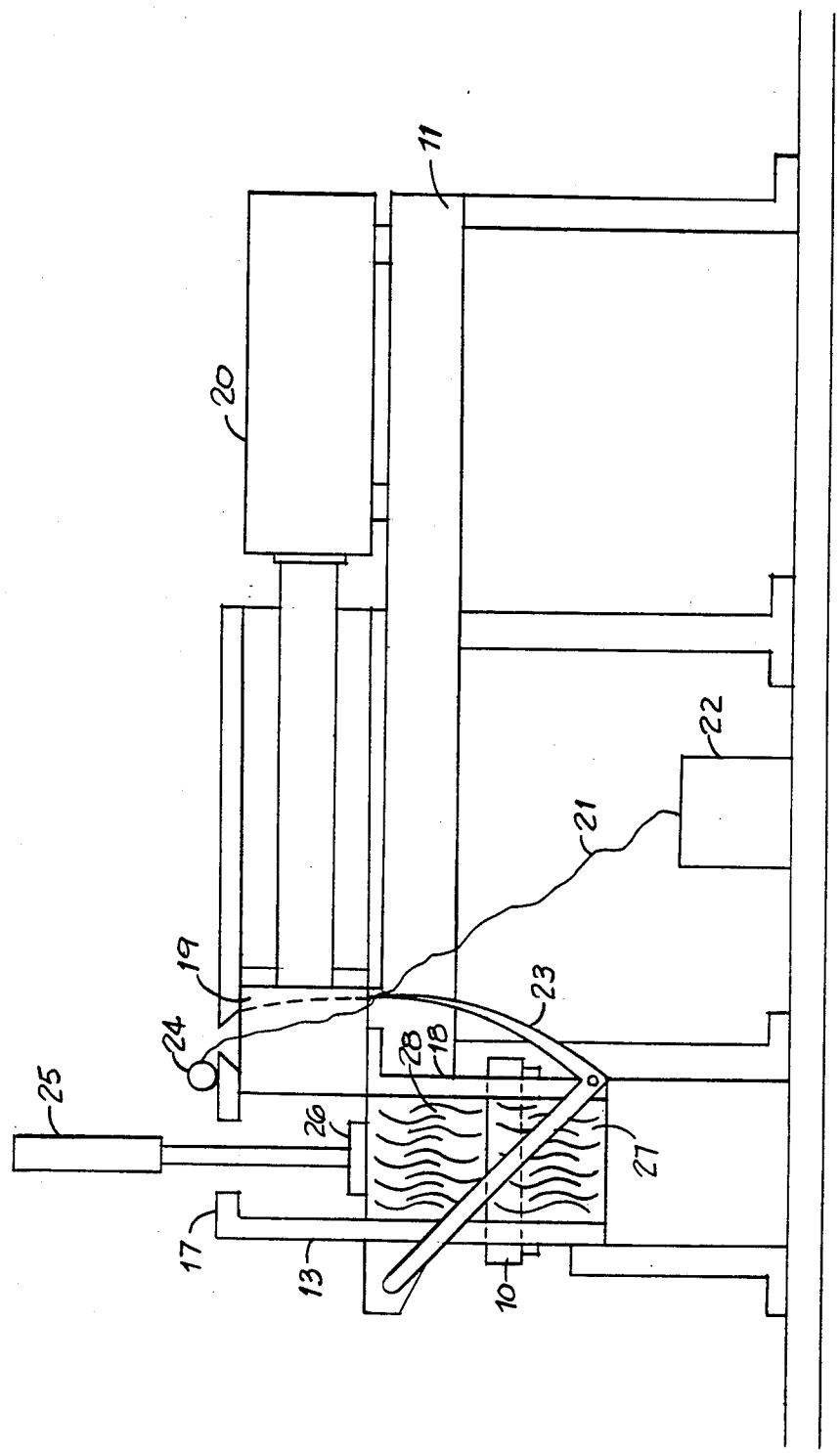
FIG. 5 is a schemkatic representational side view of the bale recompressor ejecting the second bale from the recompression chamber to the decompression chamber and forcing the first bale across the bale shear.
Figure 6:
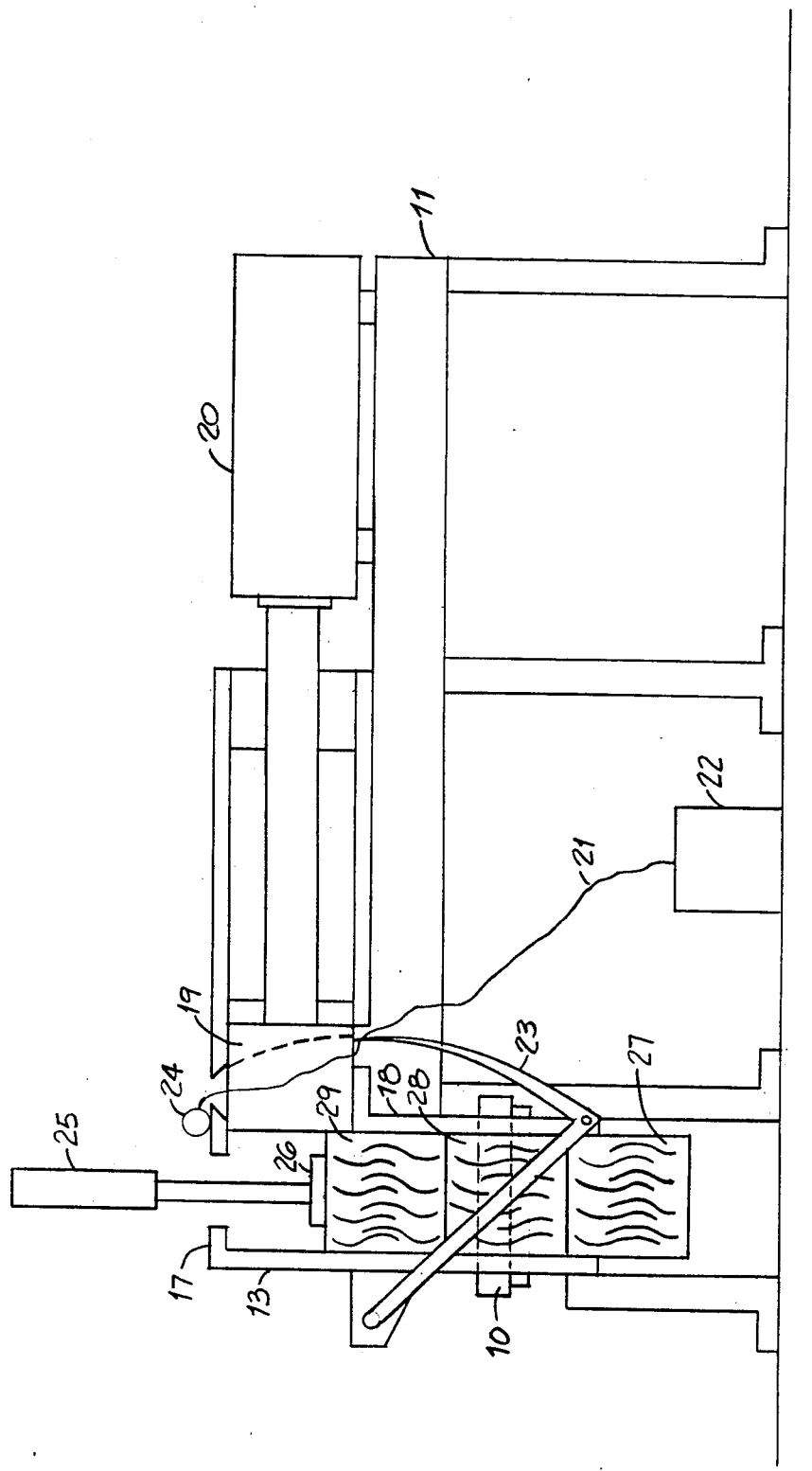
FIG. 6 is a schematic representational side view of the bale recompressor ejecting a third bale from the recompression chamber to the decompression chamber, ejecting the sheared halves of the first bale, and forcing the second bale across the bale shear.
Figure 7:
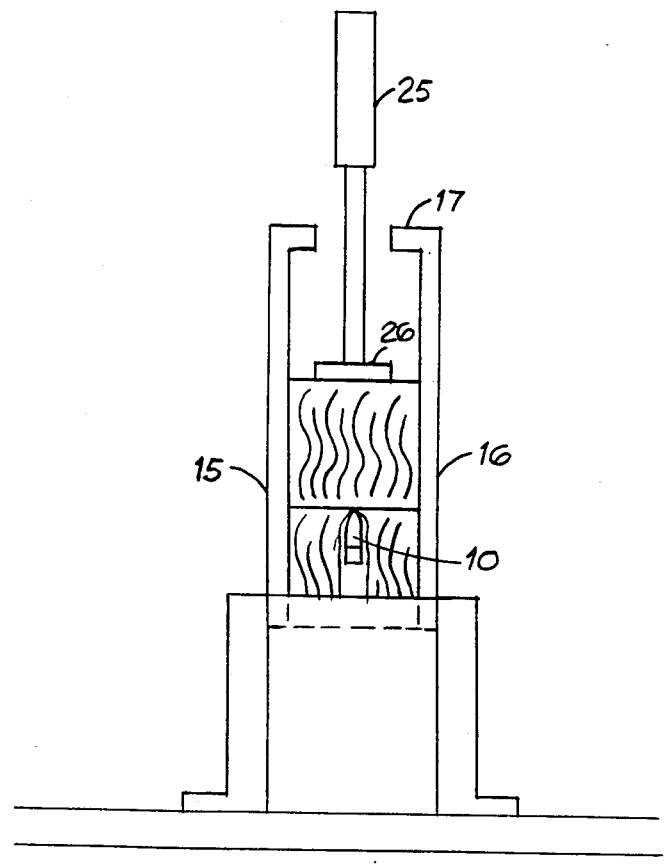
FIG. 7 is a representational front view of the bale recompressor, showing the orientation of the bale shear.

In the preferred embodiment, the recompressed bale shear 10 is shown in combination with hay bale recompressor 11 as shown in FIG. 1 through 8. The bale recompression chamber 12 is defined by end plate 13, top plate 17 and two side plates 15 and 16 (FIG. 7). In the preferred embodiment the recompression chamber 12 is open at the bottom to decompression chamber 14 which is defined by end plate 13, side plates 15 and 16 (FIG. 7) and decompression front plate 13.

Figure 1:
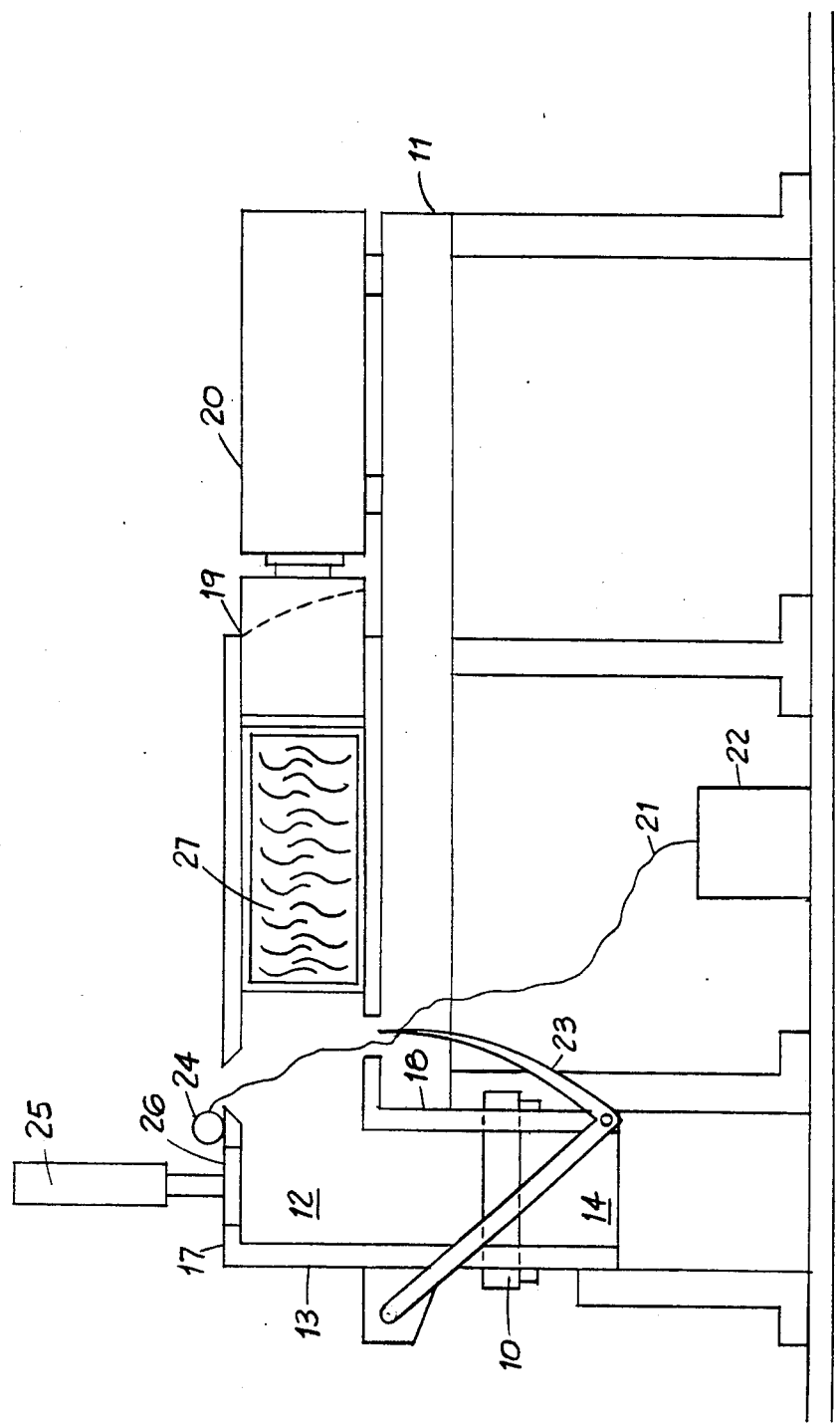
FIG. 1 is a schematic representational side view of the hay bale recompressor having a decompression chamber and bale shear with a bale of fibrous material in the recompressor.
Figure 2:
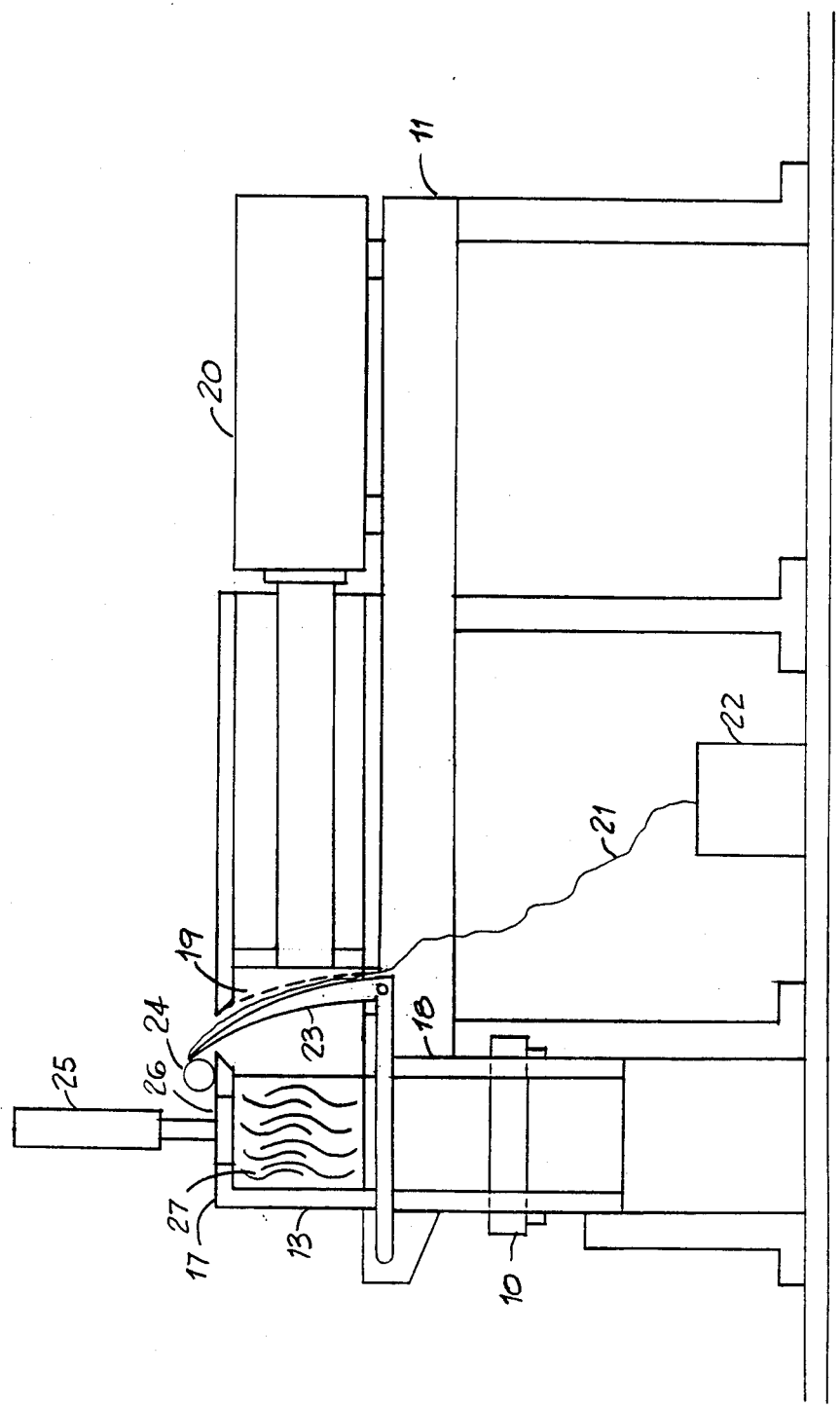
FIG. 2 is a schematic representational side view of the hay bale recompressor compressing a first bale.

Referring to FIG. 1, first field bale 27 is correctly positioned for injection into the recompression chamber 12. Once the field bale 27 has been properly positioned, as is shown in FIGS. 1 and 2, recompression platen 19, attached to recompression ram 20, pushes field bale 27 into recompression chamber 12. In the process of being pushed into recompression chamber 12, field bale 27 intercepts four strings of bale twine 21, which originate from four twine spools 22 and are threaded through needles 23 and attached to knotters 24. Field bale 27 pushes the twine 21 ahead of it. When the front of field bale 27 reaches end wall 13 it has wrapped the bale twine 21 around the bottom, front and top of field bale 27. As can be seen in FIGS. 1 through 6, the bottom of recompression chamber 12 is fully opened to decompression chamber 14. It has been found in practice that there are insufficient vertical stresses within the bale being recompressed to significantly affect the ability to recompress field bale 27 in a chamber which does not have a bottom side. As is shown in FIG. 4, a recompressed bale is eventually positioned at the top of decompression chamber 14 and functions as a bottom side to recompression chamber 12. Standard knotters 24 and standard design needles 23 are well known in the art of bale tying, and are more fully described in my patent for An Apparatus and Method for Recompressing Bales of Fibrous Material, U.S. Pat. No. 4,676,153.

Figure 3:
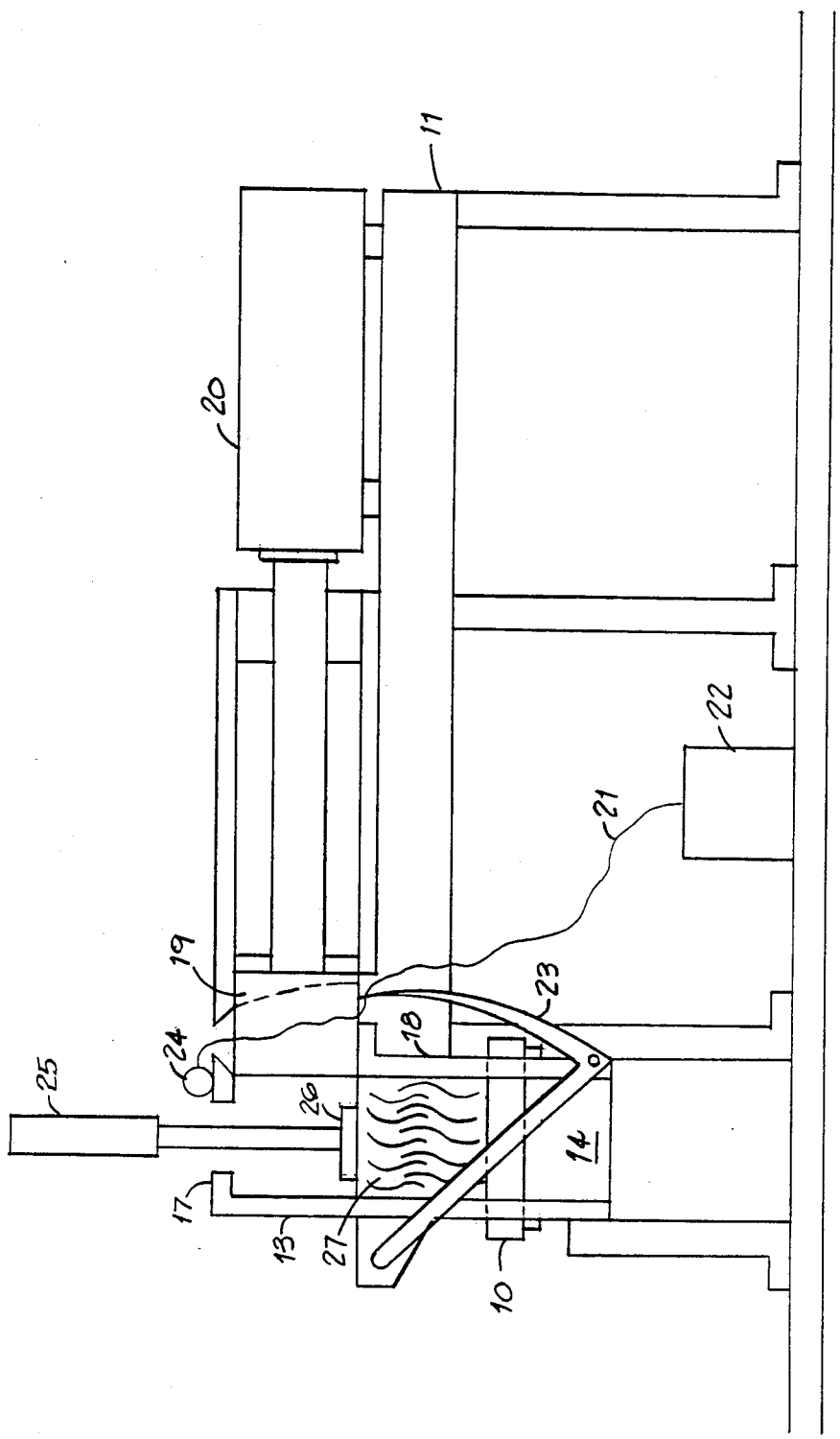
FIG. 3 is a schematic representational side view of the bale recompressor ejecting the first recompressed bale from the recompression chamber to the decompression chamber.
Figure 4:
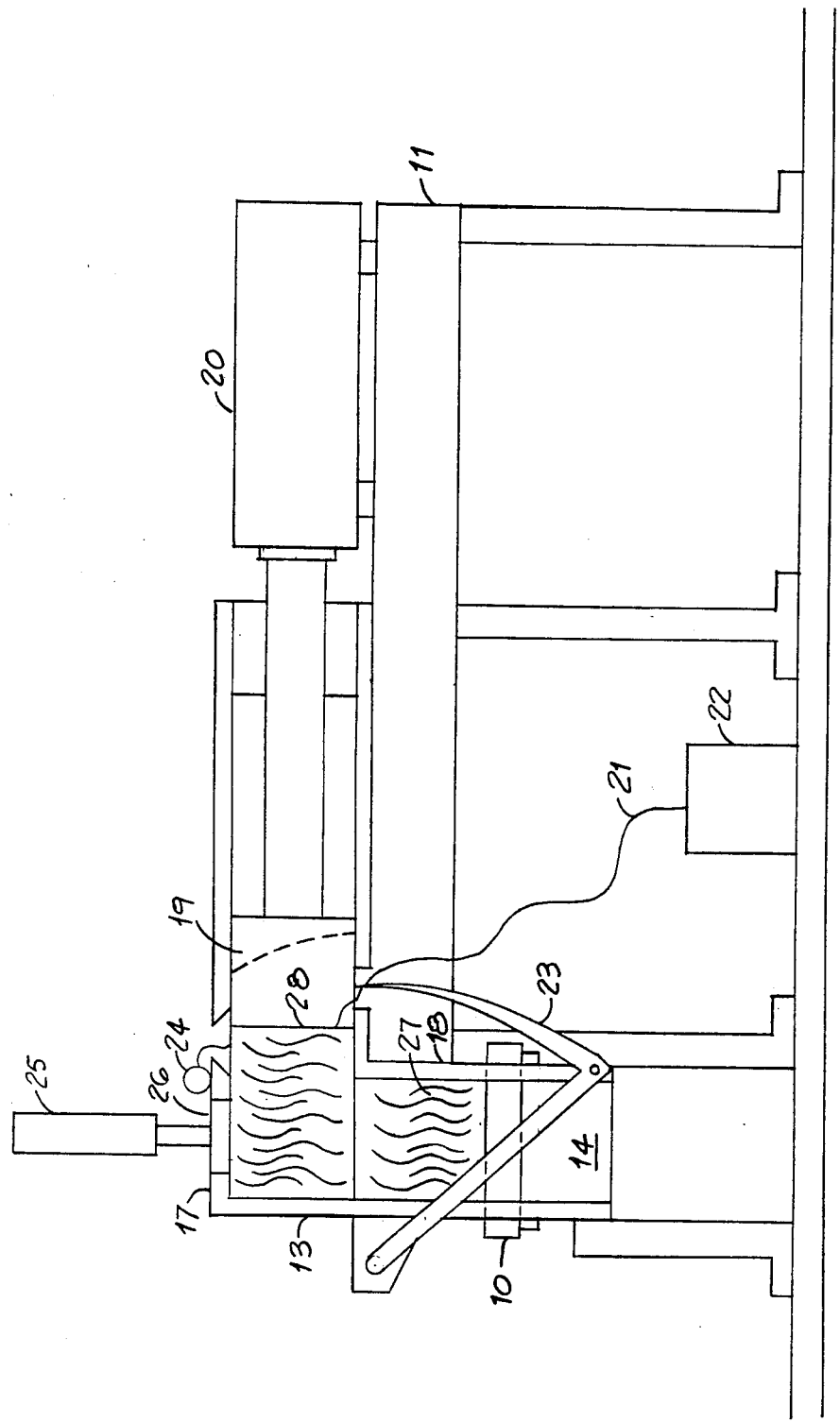
FIG. 4 is a schematic representational side view of the bale recompressor recompressing a second bale.

Referring to FIG. 3, once bale 27 has been tied and the twine 21 cut, with the bitter end of twine 21 retained by knotters 24, and needles 23 withdrawn, and prior to withdrawal of recompression platen 19, ejection ramp 25 is activated so that ejection platen 26 pushes the now recompressed bale 27 into decompresion chamber 14. As is shown in FIG. 3, the end of recompression platen 19 is aligned with the decompression chamber front plate 18 so that the recompressed bale 27 will slide into decompression chamber 14 while remaining in a fully compressed state.

Next referring to FIGS. 3, 4, 5, and 6, operation of the recompression apparatus 11, utilizing decompression chamber 14 and my bale shear 10 are shown to advantage. First referring to FIG. 3 it is shown that recompressed bale 27 is pushed into decompression chamber 14 only far enough to define a defacto bottom plate for recompression chamber 12. In FIG. 4, a second field bale 28 is being recompressed. In FIG. 5, the second recompressed bale 28 is pushed by ejection platen 26 into decompression chamber 14, thereby pushing or advancing the first recompressed bale 27 down and against bale shear 10 where first recompressed bale 27 is sheared into two separate halves while still under compression.

When third bale 29, as is shown in FIG. 6, is recompressed and pushed into decompression chamber 14, the two halves of field bale 27 are ejected by the displacement action in decompression chamber 14, as second bale 28 is itself sheared into two halves by bale shear 10.

As can be seen, the two halves of first bale 27 and each bale thereafter remain in the decompression chamber 14 for two fulls cycles of recompression operation by recompression apparatus 11. The result is that each recompressed bale is held long enough for trapped air to escape and for the fibous material to lose some of its resiliency prior to the time that bale twine 21 is subjected to the full recoil, expansion, stresses of a sheared, recompressed bale.

Figure 8:
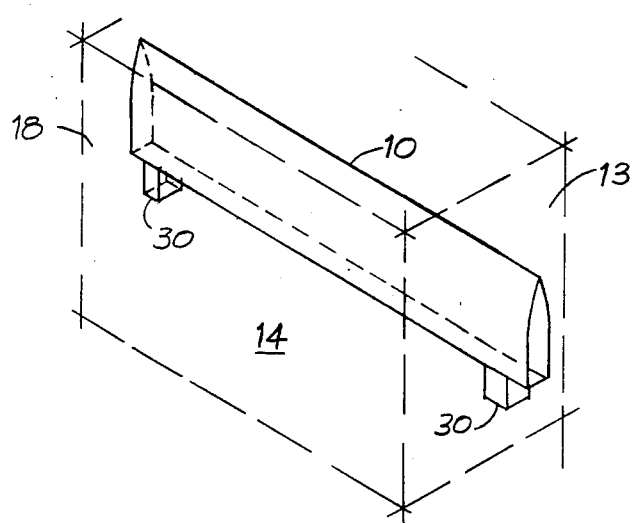
FIG. 8 is a representational perspective view of the decompression chamber, showing the orientation and mounting of the bale shear in the decompression chamber.

As can be seen in FIGS. 7 and 8, bale shear 10 is a knife blade made of hardened steel stock, which is inserted through conforming holes in end plate 13 and front plate 18 of decompression chamber 14 and rests upon keeper blocks 30, and is secured thereto by means of conventional threaded machine screws, not shown.

The use of this particular embodiment of installation facilitates the quick and simple withdrawl of bale shear 10 from recompression chamber 14 for purposes of sharpening.

By use of this invention it has been found in practice that the stresses induced by shearing of very dense bales of fibrous material are held in check by the decompression chamber 14, thus eliminating the possibility of the recompressed bale halves breaking apart due to torisonal forces against bale twine 21 induced by the stress of the shearing action.

While there is shown and described the present preferred embodiment of the invention it is to be distinctly understood that the invention is not limited thereto but may be variously embodied to practice within the scope of the following claims.

Accordingly,

What I claim is:

1. In an apparatus for recompressing bales of fibrous material having a recompression chamber having at least three of a combination of top, bottom and two side walls, and a fixed end wall and one unenclosed wall, a recompression ram having a platen slidably positioned within said chamber, entry means for introducing a bale of fibrous material into said chamber, a decompression chamber attached to and open to the unenclosed wall of the recompression chamber adapted in size to receive the recompressed bales under compression from the recompression chamber, transfer means for transferring recompressed bales under compression, from the recompression chamber to the decompression chamber, wherein the improvement comprises a bale shear disposed within the discharge end of said decompression chamber for shearing said recompressed bales, under compression, into two halves.

* * * * *